United States Patent [19]

Sheedy et al.

[11] Patent Number: 4,912,637
[45] Date of Patent: Mar. 27, 1990

[54] VERSION MANAGEMENT TOOL

[75] Inventors: Christopher R. Sheedy, Los Altos; Stephanie L. Kinoshita, Mountain View, both of Calif.

[73] Assignee: Tandem Computers Incorporated, Cupertino, Calif.

[21] Appl. No.: 183,190

[22] Filed: Apr. 26, 1988

[51] Int. Cl.⁴ .............................................. G06F 1/00
[52] U.S. Cl. .................................................... 364/300
[58] Field of Search ........................ 364/200, 300, 900

[56] References Cited
U.S. PATENT DOCUMENTS
4,558,413 12/1985 Schmidt et al. ..................... 364/300

Primary Examiner—Raulfe B. Zache
Attorney, Agent, or Firm—Townsend & Townsend

[57] ABSTRACT

A system for preserving, generating, and merging different versions of a common module that utilzes a line file storing the text of every line in a version and addressing each line with a unique line identifier. Any desired version may be generated directly without creating intermediate versions. The unique line identifiers facilitate a merge operation that does not duplicate lines.

10 Claims, 14 Drawing Sheets
Microfiche Appendix Included
(6 Microfiche, 1240 Pages)

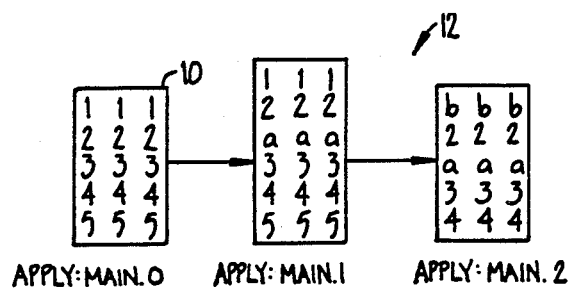
FIG._1A.
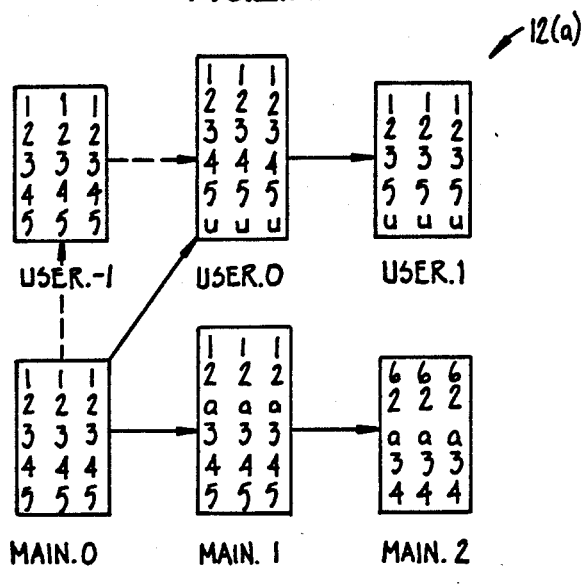
FIG._1B.
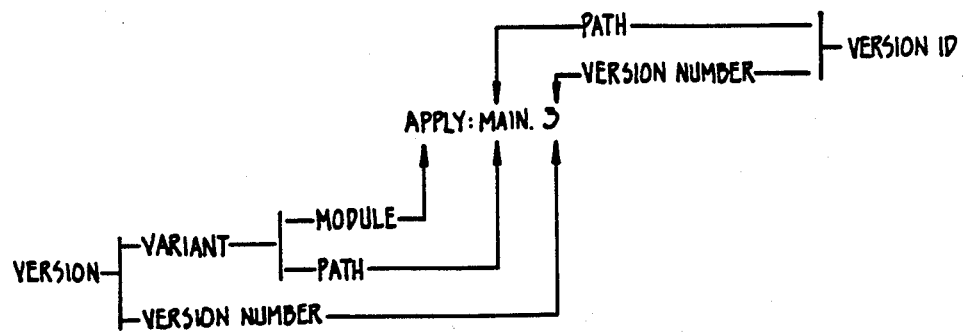
FIG._2.

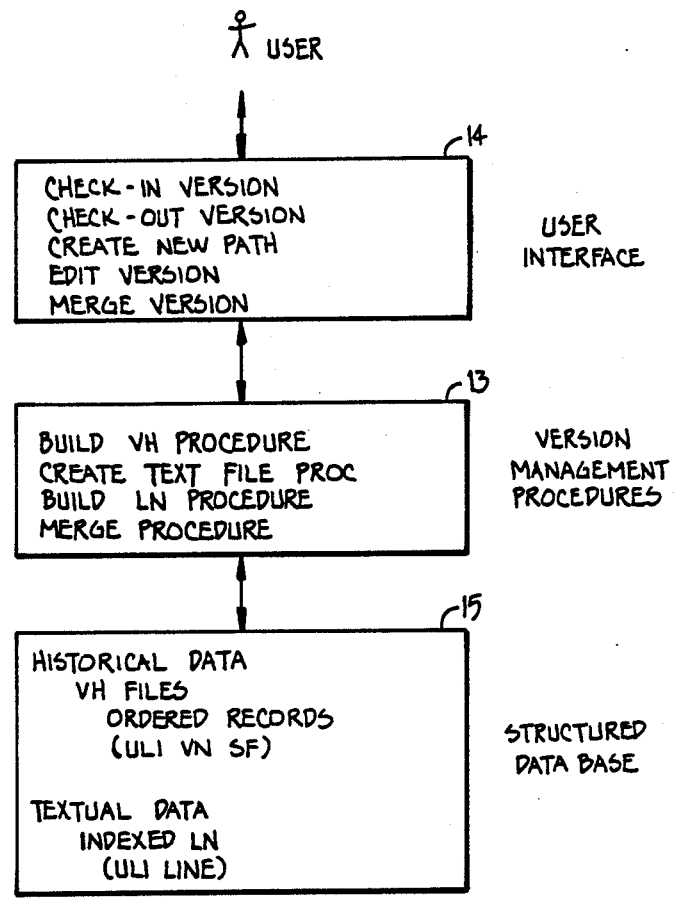
*FIG._3A.*
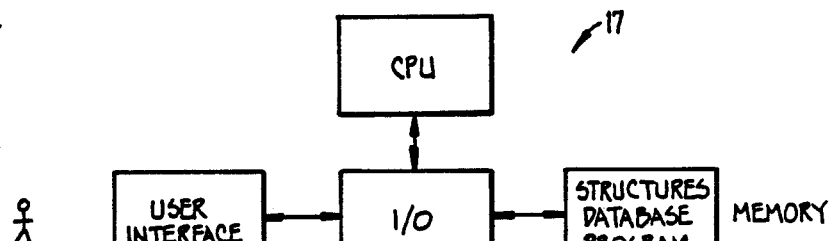
*FIG._3B.*

FIG._4.
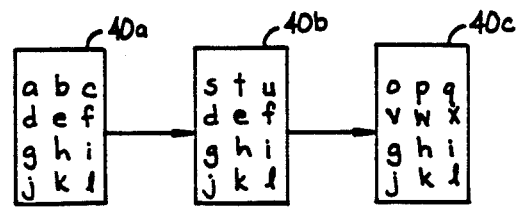
FIG._5.

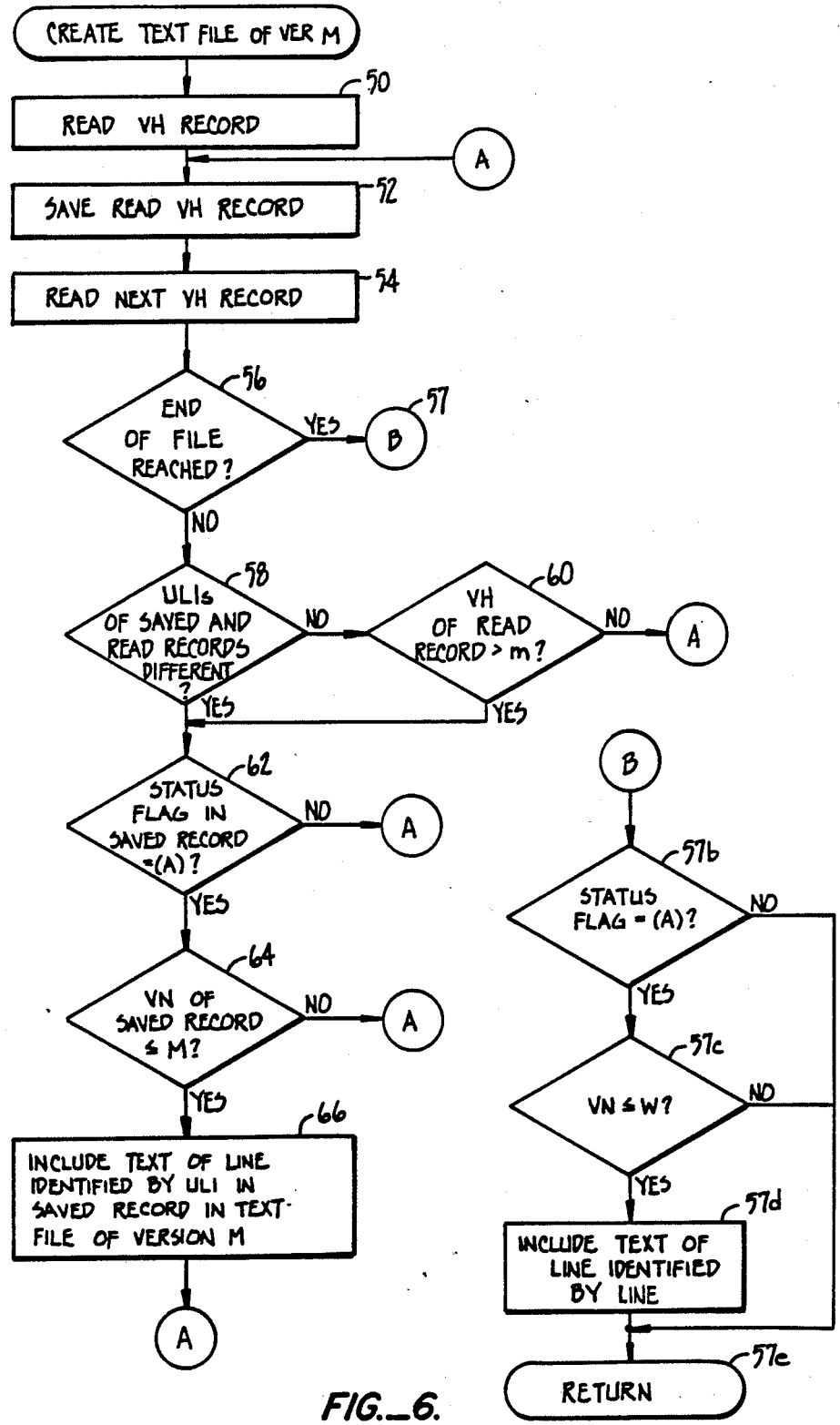
FIG._6.

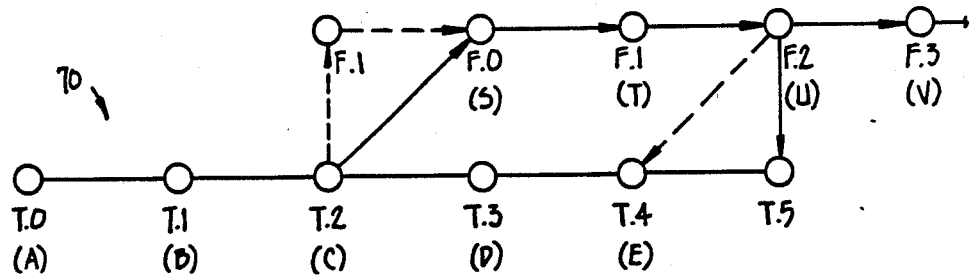

FIG._7.

| 83 | TO TARGET PATH | | | | | |
|---|---|---|---|---|---|---|
| | ACTIVE <= 1 | ACTIVE > 2 | INACTIVE DELETE <= 3 | INACTIVE DELETE > 4 | INACTIVE REPLACE <= 5 | INACTIVE REPLACE > 6 |
| 1 ACTIVE <= | 0 A | 1 A | 2 I | 3 I | 4 R | 5 R |
| 2 ACTIVE > | 6 A* | 7 A* | 8 A* | 9 CONFLICT A* (4) | 10 A* | 11 CONFLICT A* |
| 3 INACTIVE DELETE <= | 12 I* | 13 A | 14 I | 15 I | 16 CONFLICT R | 17 CONFLICT R |
| 4 INACTIVE DELETE > | 18 I* | 19 CONFLICT A (11) | 20 I* | 21 I* | 22 I* | 23 CONFLICT R |
| 5 INACTIVE REPLACE <= | 24 R* | 25 A | 26 CONFLICT R* (9) | 27 I | 28 R | 29 CONFLICT R* |
| 6 INACTIVE REPLACE > | 30 R* | 31 CONFLICT A | 32 CONFLICT R* | 33 CONFLICT R* (9) | 34 CONFLICT R* (10) | 35 CONFLICT R* |

FIG._8.

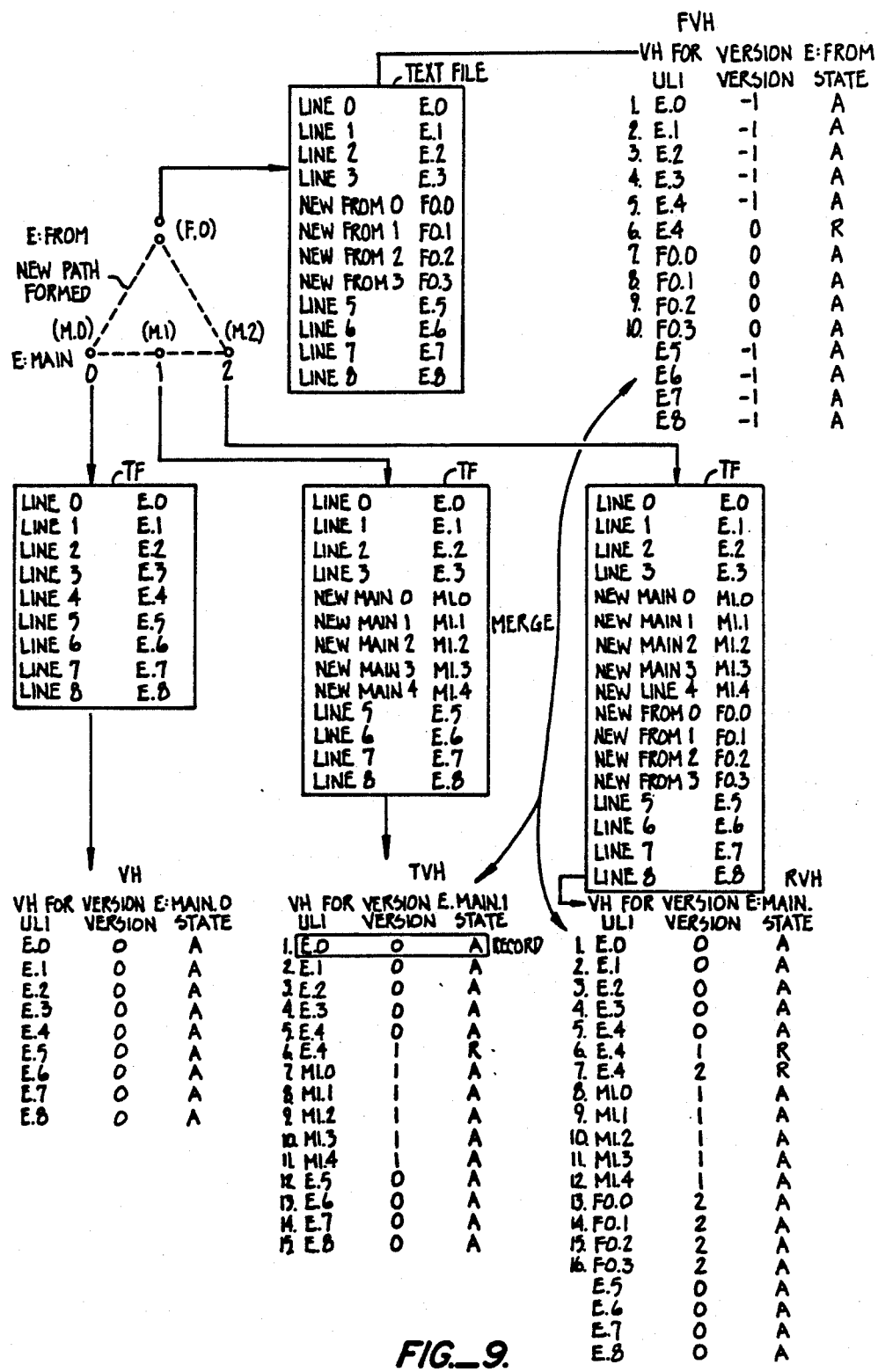
FIG._9.

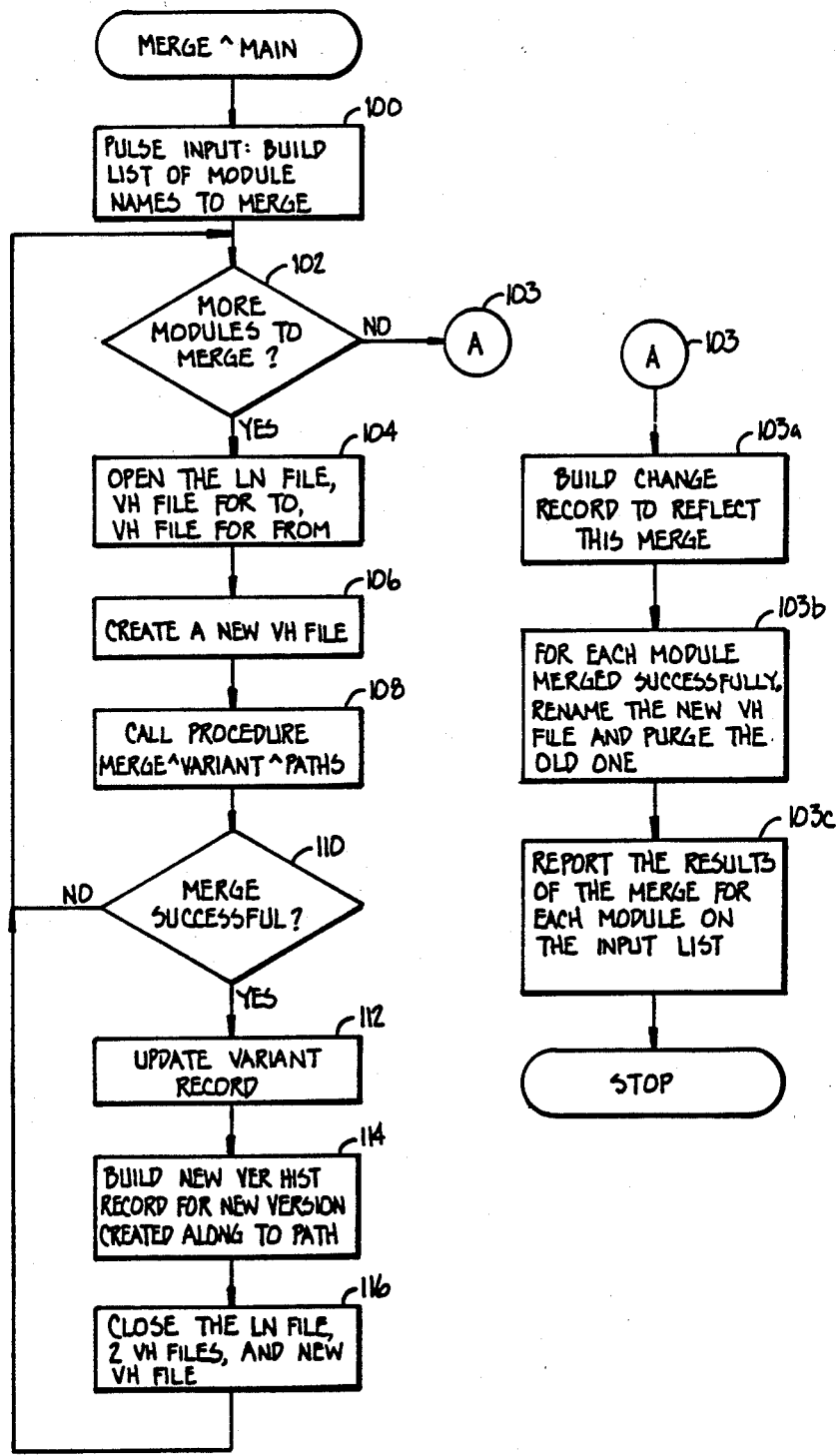
FIG._10.

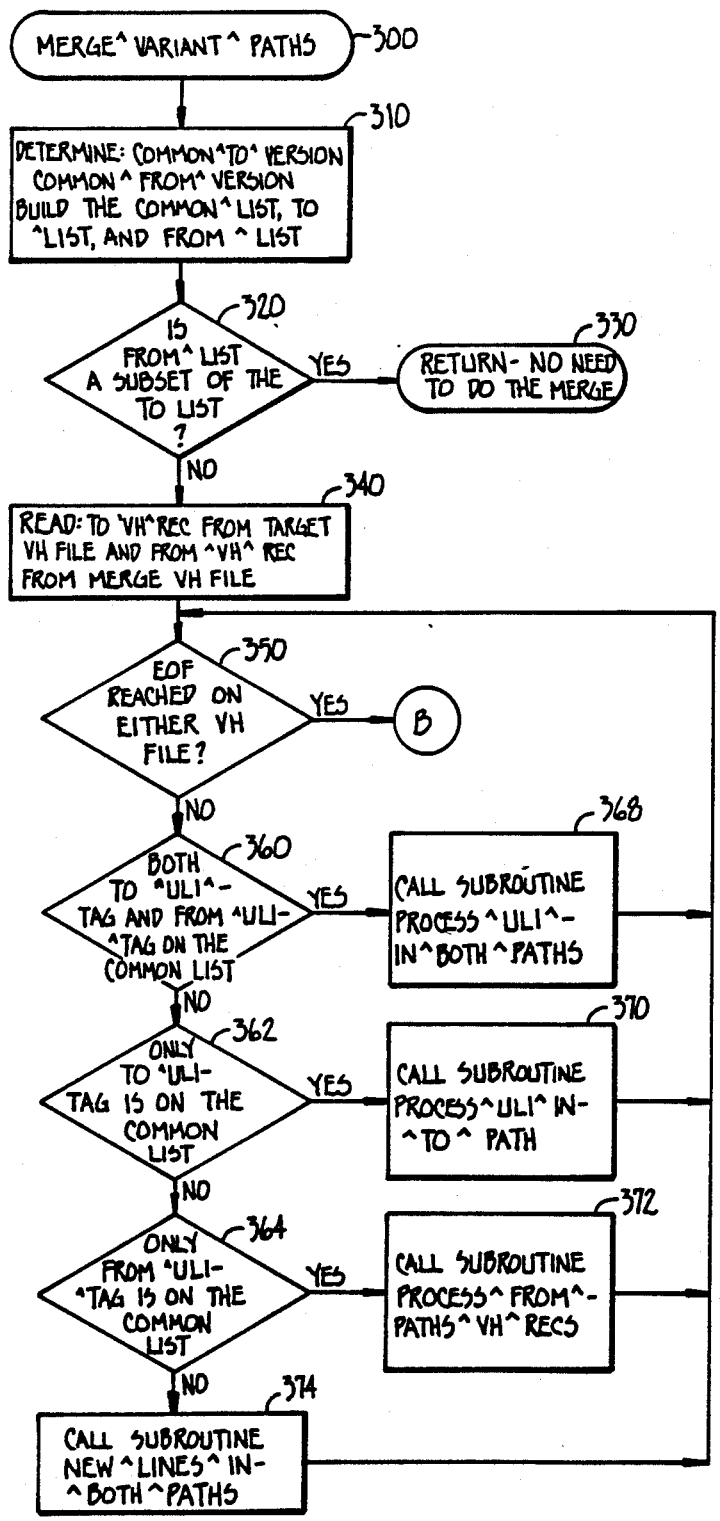
FIG._11.

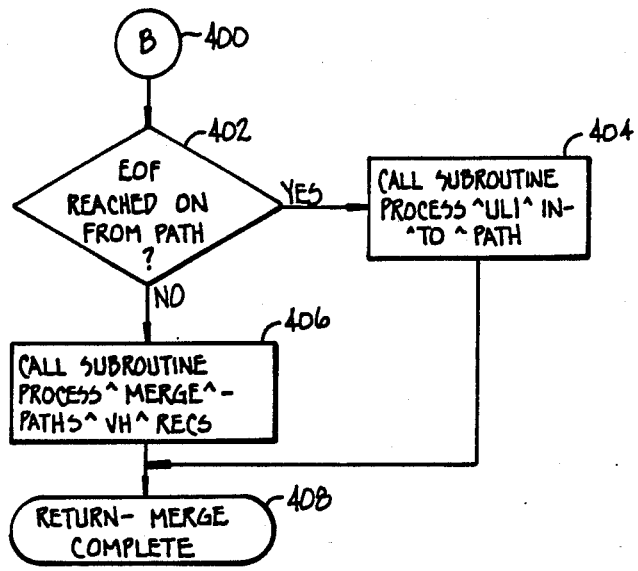
FIG._12.
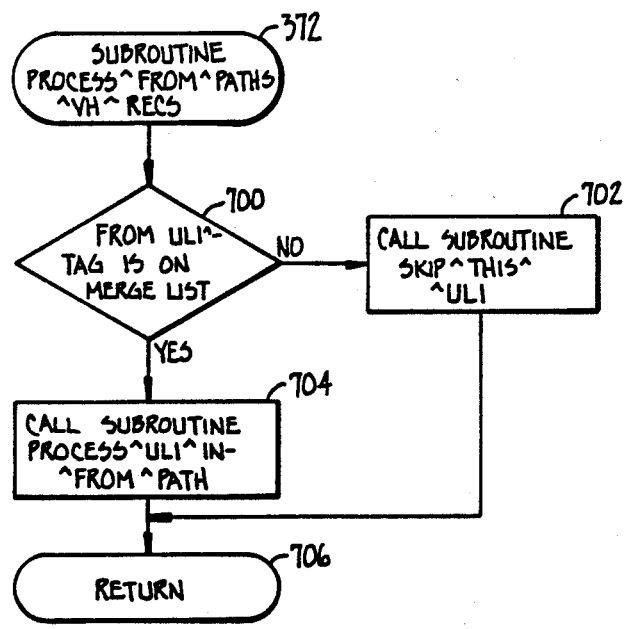
FIG._15.

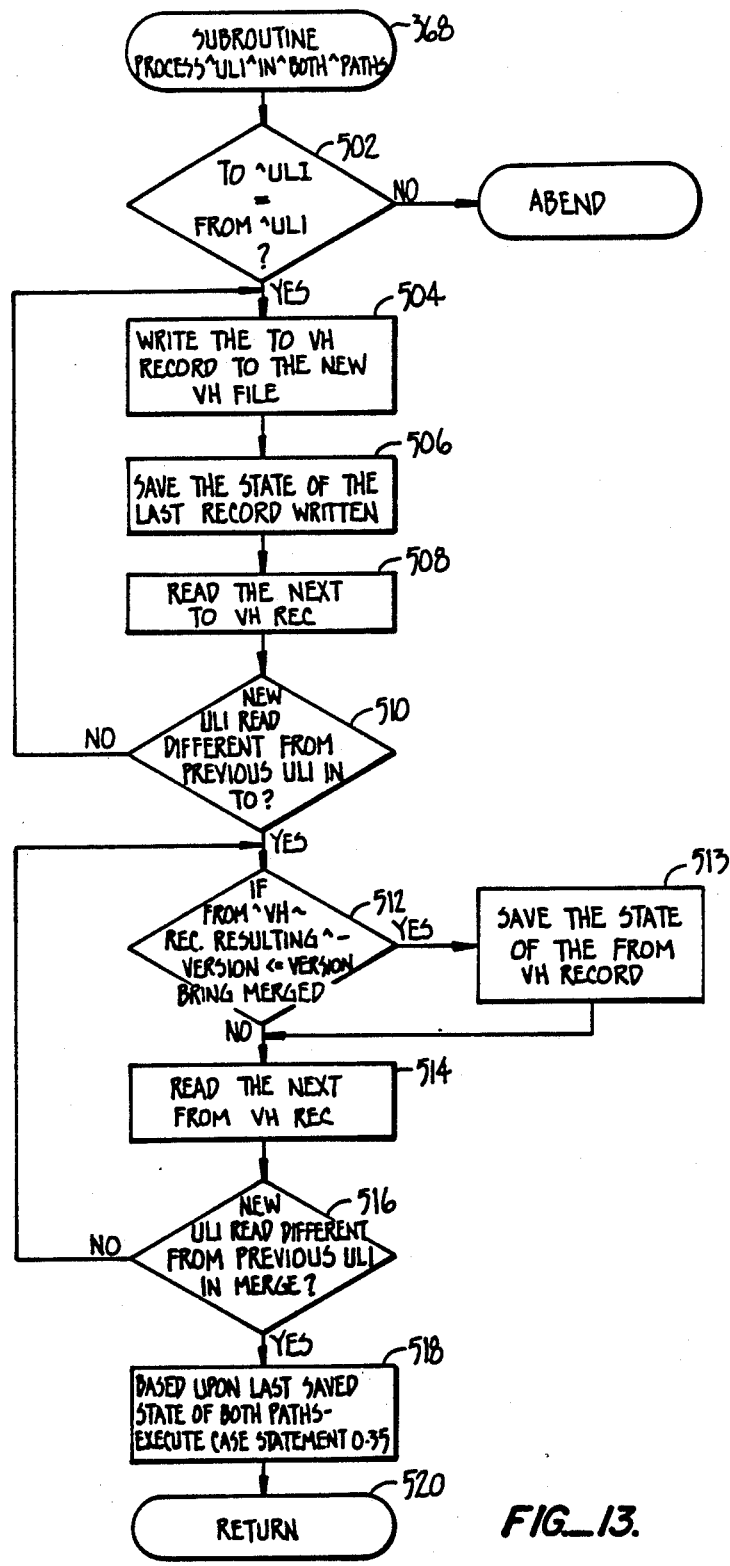

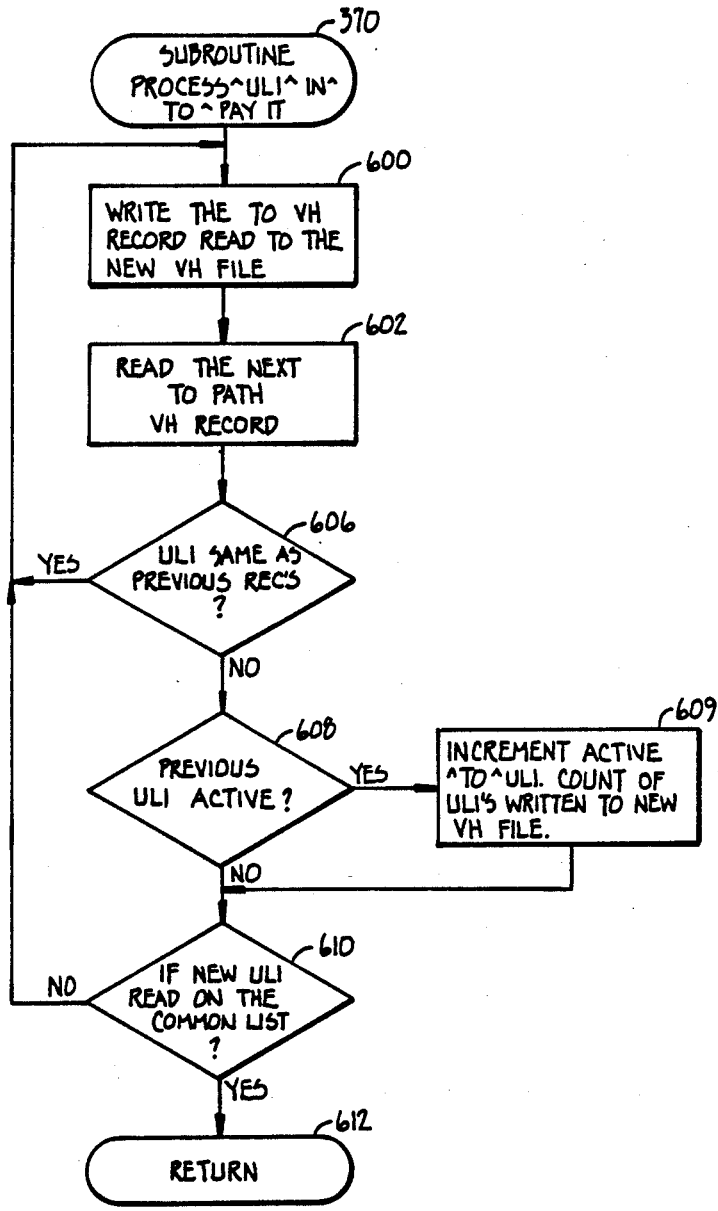
FIG._14.

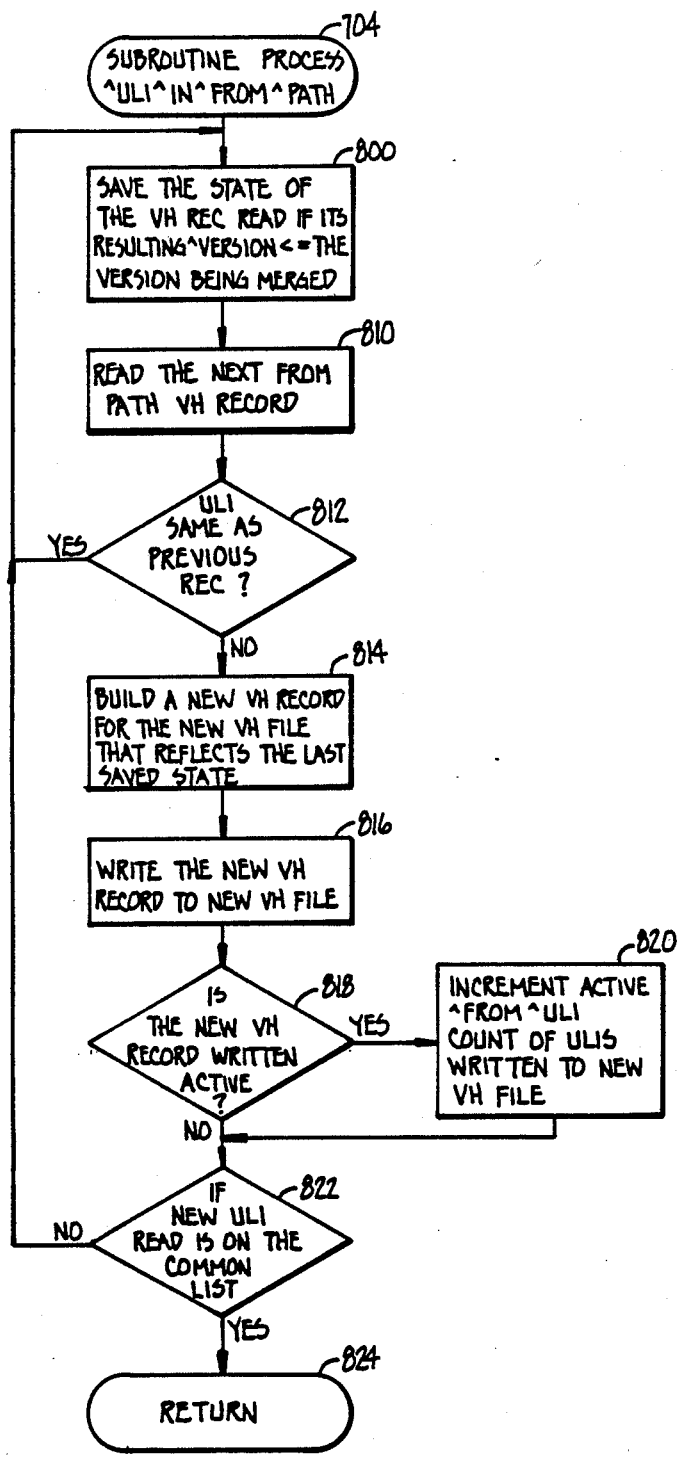
FIG._16.

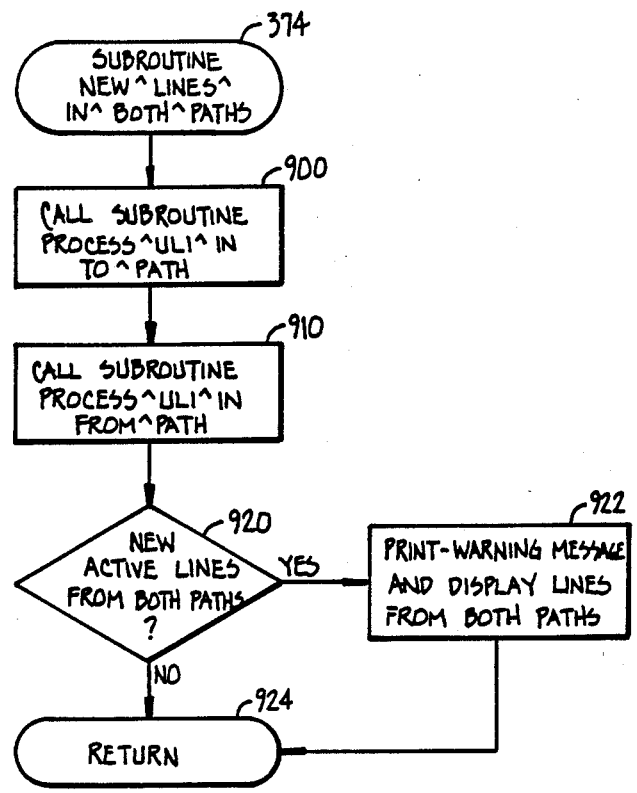
FIG._17.
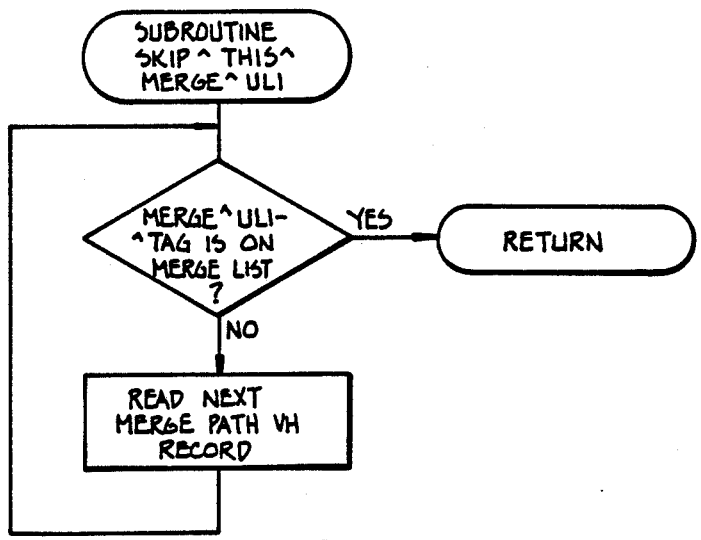
FIG._18.

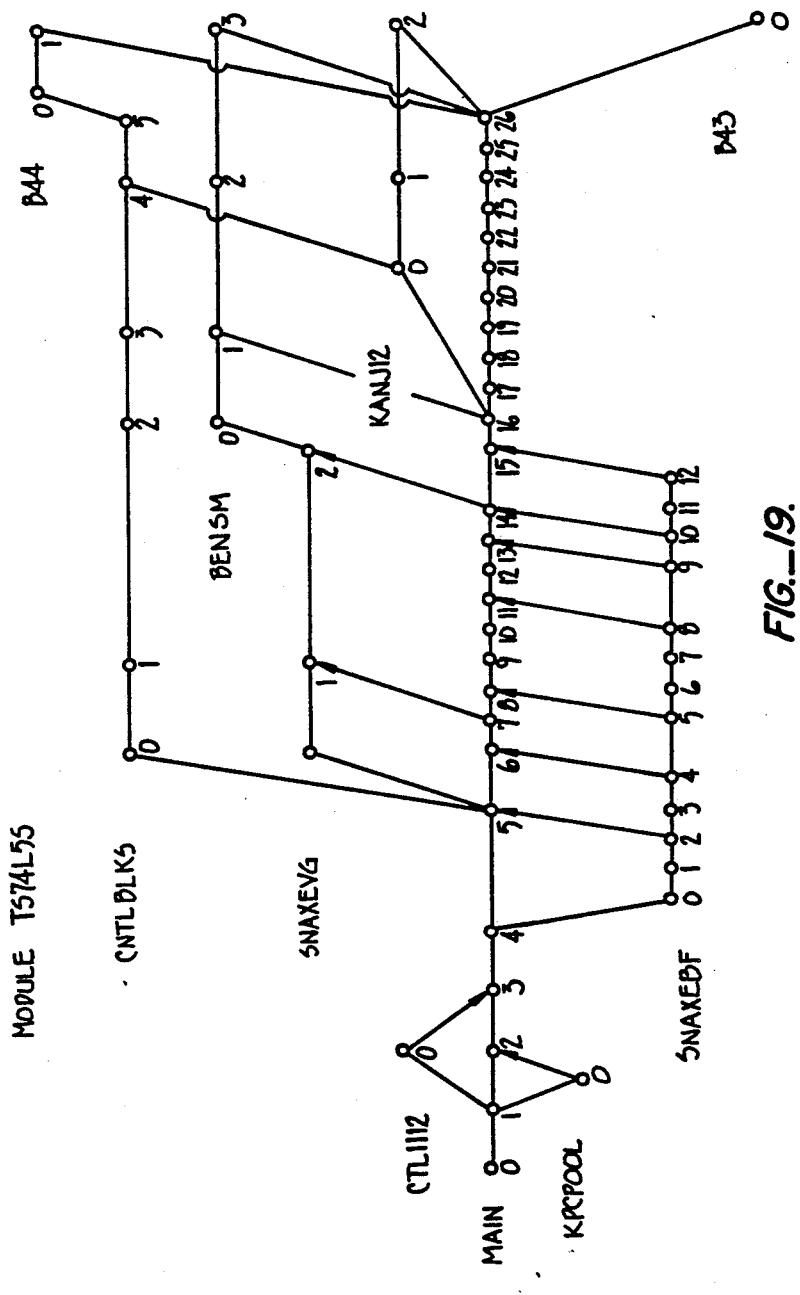
FIG._19.

VERSION MANAGEMENT TOOL

MICROFICHE APPENDIX

A source code listing of a preferred embodiment of the invention is appended in the form of 1240 pages recorded on microfiche.

BACKGROUND OF THE INVENTION

1. Field of the Invention

The present invention relates generally to the field of software development tools and more particularly relates to a system for maintaining control of various versions of a file and for merging different versions of the same file.

2. Description of the Relevant Art

An important type of software development tool manages multiple versions of a common text file. e.g., a program. Typically, this function is required in a software development environment where programs are revised frequently, often by different people, and where previous versions must be preserved. Also, it may be required to merge the changes introduced into independent versions of a common file.

One approach to developing such a management system is described in an article by Tichy entitled "RCS-A System for Version Control", Software-Practice and Experience. John Wiley & Sons, N.Y., 1985, pp. 637–654. That article describes common methods for preserving every version of a file and for merging versions of the same file.

Turning first to the method of preserving versions, the delta method is described in the abovereferenced article. A delta is a series of edit commands that change one version into another. A delta may be a forward delta, for changing a given version into the immediately following version, or a reverse delta, for changing a given version into an immediately preceding version.

A reverse delta system is often preferred because experience shows that often the most frequently required version is the last version created. In a reverse delta system, the last version is stored intact and may be immediately accessed. Text files of previous versions must be created by successively applying reverse deltas to the last version created.

A significant limitation in using the delta system to create a text file of a version separated from the last version by several intermediate versions is that each intermediate version must be created and changed by the appropriate delta. This iterative process limits the speed of accessing intermediate versions.

A given file may develop along a single path where each version evolves from the immediately preceding version. Often however, development of a file may proceed along several independent paths. For example, a first programmer may check out a given file and proceed to create several versions along a first path. A second programmer may check out the same given file and proceed to create several versions along a second path. The changes introduced along the first and second paths may be completely independent, e.g.. the two programmers might not talk to each other and have different development goals. The paths are related since they diverge from the same given file.

In some cases, it may be desirable to merge two versions created along independent paths to form a resulting version incorporating the changes introduced along both paths. For example, referring to the example above, the first programmer may be improving a first aspect of the given program and the second programmer may be improving a second aspect. When they have completed their tasks, a new program improved in both aspects may be created by merging versions from the two paths.

A problem in merging occurs when the same line of the given program is changed in both versions to be merged. It is possible that the changes made will conflict and not be compilable. Accordingly, merge programs have been developed including rules for processing lines changed in both versions.

In many existing systems, the lines included in a given version are identified by line numbers. During a merge, the line numbers in the versions to be merged are compared and lines identified by specified line numbers are included in a resulting version. However, often lines will be duplicated in the resulting version because identical lines will have different line numbers in the versions to be merged.

Accordingly, there is a need for improved software development tools having efficient systems for preserving development versions of a text file, creating desired versions, and merging versions developed along independent paths.

SUMMARY OF THE INVENTION

The present invention is a version management tool having improved systems for preserving all versions, creating any desired version, and merging versions developed from a common file along independent paths.

In a preferred embodiment, the fundamental unit for editing is a complete line of text. Thus, to change a character in a given line of text requires that the given line be deleted and replaced by a new line having the desired character changed. Every line active (included) in any version of a given file is included in an indexed line file and tagged by a unique line identifier (ULI). The history of the status of each line in the various versions is recorded in a variant history file.

According to one aspect of the invention, the variant history file is an ordered set of records with each record including a ULI. a version number, and a status flag. In one embodiment, if the value of the status flag is (A) then the line identified by the ULI becomes active in the version identified by the version number included in the record, if the value of the status flag is (D) then the line identified by the ULI is deleted in the version identified by the version number included in the record, and, if the value of the status flag is (R) then the line identified by the ULI is replaced in the version identified by the version number in the record.

According to a further aspect of the invention, the text file of a desired version is created by searching the variant history records to identify ULIs of lines active in the desired version. The lines identified are retrieved from the line file and included in the created text file. The search is facilitated by ordering the records in the variant history file so that a record indicating that a ULI is replaced immediately follows the record indicating that the ULI became active. These records are processed as a pair and the version numbers compared to the version number of the desired version. If the ULI becomes active in a version created before the desired version and is deleted or replaced in a version following the given version then the ULI is active in the desired version and the line identified by the ULI is included in the text file of the desired version.

In the preferred embodiment, the line file and variant history files of a FROM path and a TO path are utilized to merge a FROM version in the FROM path into a TO version in the TO path to form a resulting version. The result of the merge is that lines are either added to or deleted from the new TO version. Accordingly, the effect of the merge operation is to modify the TO variant history file to create a resulting variant history for the TO path. This resulting variant history is utilized to create the text file of any desired version, including the resulting Version, in the TO path.

According to a further aspect of the invention, a unique change tag is associated with the operation of creating each version of a module. When a line is first added to a version, the ULI created for the line includes the change tag associated with the version and a sequence number. A change tag list may be built for any version that includes all change tags which have been applied to create the version.

In an embodiment of the merge operation, the change tag list for the TO and FROM versions are built and a common list of change tags which are included in both lists is built. For lines identified by ULIs having a change tag in the common list, the status of the line in the resulting version is determined by the status of the line in the TO and FROM versions and a predetermined set of rules.

One embodiment includes a computer, operating under control of a stored program, for executing the program to perform the procedures described above. The indexed line file and variant history file are built, stored in the computer memory, and utilized to create a text file of a desired version or to merge two versions to form a resulting version.

Other advantages and features of the invention will become apparent in view of the drawings and following detailed description.

BRIEF DESCRIPTION OF THE DRAWINGS

FIG. 1A is a schematic diagram of a path of development;

FIG. 1B is a schematic diagram depicting the formation of a second path;

FIG. 2 is a schematic diagram depicting a naming system;

FIG. 3A is a schematic diagram illustrating the use of an exemplary embodiment of the version management tool loaded into a general purpose digital computer;

FIG. 3B is a block diagram of a general purposed digital computer configured as a version management tool;

FIG. 4 is a schematic diagram depicting a set of variant history (VH) files and line (LN) files;

FIG. 5 is a schematic diagram depicting the text files corresponding to the variant history files depicted in FIG. 4;

FIG. 6 is a flow chart of a procedure for creating the text file of a desired version:

FIG. 7 is a schematic diagram depicting a merge operation;

FIG. 8 is a diagram of a status matrix;

FIG. 9 is a schematic diagram depicting exemplary text files, variant history files, and line file for explaining the merge operation;

FIGS. 10 through 18 are flow charts of the procedures for performing the merge operation: and FIG. 19 is a schematic diagram depicting a complex merge operation.

DETAILED DESCRIPTION OF THE PREFERRED EMBODIMENTS

The present invention includes a unique system for organizing information regarding multiple versions of a common text file. This information is organized in a manner that provides for directly creating the text file of any previously created version of the common text file and for efficiently merging the changes introduced in any two independent paths to create a resulting version incorporating those changes.

GENERAL CONCEPTS AND TERMINOLOGY

The terminology utilized herein will now be defined with reference to FIGS. 1 and 2. Referring to FIG. 1, a module is the name of a source file 10 checked into the system. In this example the module name is APPLY. A version of the module may be conceptualized in terms of a simple text file. For example, if text file X is in the system, then it can be duplicated to create text file Y which is then modified. Thus Y represents a different version of X. The file Y is then checked back into the system. Versions of files checked into the system are immutable and a request for any file checked into the system retrieves the identical file checked in.

In FIG. 1A, a path 12 of development of the module 10 is depicted. Each version in the path is identified by a path name (MAIN) and a version number. To create version (MAIN.1) the module (MAIN.0) is checked out (duplicated) and line aaa is added between line 222 and 333. This modified text file is then checked in as (MAIN.1). A unique change tag (tag). comprising a field of characters, is associated with each operation that creates a new version. Thus, a tag is associated with the operation that creates (MAIN.1) The versions in a path are identified by version numbers (VN).

Each version in the path 12 is created by modifying the immediately preceding version in the path. FIG. 1B depicts two paths of a module formed from the version (MAIN.0). Referring to FIG. 1B. the new path 12(b) is formed when a version in a path is checked out, given a new path name, modified, and checked back in. In FIG. 1B. the version (MAIN.0) is checked out. given the path name USER, modified, and checked in. Thus, the version created from (MAIN.0) is (USER.0). Changes subsequently entered into the two paths will be independent.

The naming scheme utilized will now be described with reference to FIG. 2. A variant is a logical name that is used to associate one or more versions on a single path of a particular module. This name consists of a module name and a path name. For example, in FIG. 1B the two variant names are APPLY:MAIN and APPLY:USER. A version-id includes a path name and version number, e.g., (MAIN.1).

ORGANIZATION OF THE SYSTEM

FIG. 3A is a schematic diagram depicting the use of version management procedures 13 loaded into a general purpose digital computer for creating and using a version management system. A user utilizes a user interface to check-in a source file module, check-out desired versions of the module, modify the checked-out version, check-in the checked-out version, name and create new paths of development, and merge modules in independent paths to create a resulting module incorporating the changes introduced along the independent paths.

The text files of the various versions are encoded in machine readable form and stored in a structured database 15. The version management procedures 13 build an indexed line file in which the text of every line of every version is stored. Each line is identified by a unique line identifier (ULI). The version management procedures 13 also create a variant history (VH) file in structured database 15 for each path. The variant history file stores information relating to the status of the lines in each version along a path.

Additionally, a merge procedure utilizes the indexed line file and variant history files to generate a resulting version incorporating changes introduced along two paths.

FIG. 3B depicts a standard general purpose digital computer 17 configured as a version management system. The various version management procedures are stored as program data in the computer memory. The computer memory includes the main memory and peripheral storage devices such as disk drives, tape drives and so forth. During operation, the program data is executed in standard fashion. The various version management procedures are executed to build the structured database in the computer memory, to create text files of desired versions, and to merge versions from independent paths.

FIG. 4 is a schematic diagram of a line file (LN) 20 and variant history file (VH) 22 utilized to form different versions of a given module on a given path. A new VH file is created for each independent path of a module. Whenever a new version of a variant is created, a comparison is made between the existing latest version and the text file being checked in. The comparison reports three types of differences, resulting in an updated VH file being written and, possibly, additions being made to the LN file. These three types of differences are:

Deletion: Lines were deleted in the text file. In the new VH file, new records for these ULIs are written, indicating that these lines are "deleted", in this version.

Insertion: New lines were introduced in the text file, directly before a line with ULI "M" which was unchanged. New ULIs are assigned to the new lines, and new records are introduced in the VH file, directly before the first record for line M. New records containing the text of the new lines are added to the LN file, with the new ULIs as their keys, the text Replacement: New lines were introduced in file, replacing one or more lines in the version which was checked out. This change is treated as a combination of a deletion and insertion. In the new VH file, new records for the deleted lines are written, indicating that these lines are "replaced" in this version. New ULIs are assigned to the new lines, and new records are introduced in the VH file, directly after the records for the replaced lines. New records containing the text of the new lines are added to the LN file, with the new ULIs as their keys.

In the present embodiment, the smallest unit of change within a module is a line. Thus, if a character in a line is modified this modification is accomplished by deleting the unmodified line and replacing it with a new line. Referring now to FIG. 4, the LN 20 is an indexed file that includes the lines active in all versions in all paths of development of a module. Each line is identified by a unique line identifier (ULI) 24 consisting of two parts; a change tag 26 (which identifies when the line was added to the module) and a sequence number 28 (which identifies the line within a tag s changes). The ULI functions as an address for the lines in the LN 20 and is utilized to access the lines to create a text file of a selected version. The variant history file 22 comprises an ordered list of records 30. These records 30 indicate changes of status of the lines, identified by the ULIs in the records, in the various versions along the given path. The change of status of a given line is indicated by the values of a status flag (A for active). (R for replaced), and (D for deleted) and a version number (VN) of a version in the given path. For example, if a line identified by ULI(1) is added in version 3, then the VH record includes ULI(1). the value of the status flag is (A), and VN=3. The VH file may include several records for a given ULI if the line identified undergoes several status changes. The records in the VH file are ordered to facilitate the direct creation of a text file for any version in the path.

Referring back to FIG. 1B. a version (USER.−1) created in the USER path is a copy of (MAIN.0). The VH file of the MAIN PATH (MVH) is copied to form the VH file of the USER path (UVH). The UVH is then updated to reflect the change made to (MAIN.0). or equivalently (USER.−1), to form (USER.0).

The creation of (USER.−1) is necessary to create a VH file for the USER path and illustrates the fact that the paths diverge from the module (MAIN.0). The path of development of both paths up to and including version (MAIN.0)/(USER.−1) is identical. To reflect this identity, the UVH file is built by creating a set of records corresponding to the records in the MVH file. The ULI and status flag in corresponding records are identical. However, the VNs in the UVH records are set to −1.

The creation of (USER.−1) is transparent. The first version in the USER path subject to normal processing is (USER.0), where the line uuu is added to the text file of (MAIN.0).

It is possible to reactivate a deleted or replaced line using a backout operation. This operation removes changes associated with a particular version of a module. For example, a line identified by a given ULI might be deleted to create the particular module. If this change were subsequently backed out, then the line would become active again. This activation would be reflected in a VH record including the given ULI, the VN of the version created by the backout operation, and the status flag (A).

FIG. 5 depicts three versions 40 of a module formed on a first path. The LN 20 and VH files 22 corresponding to these versions are depicted in FIG. 4. The formation of the LN 20 and VH 22 for the first path will now be described.

The LN 20a for the first version 40a includes all the lines of the first version 40a with each line identified by a ULI 24. The field E in the ULIs is the change tag associated with the operation of creating the first version.

In the second version 40b. the first line of the first version 40a has been replaced by a new line. Referring to the second LN 20b, the new line has been added to the LN 20b and is identified by a ULI where the field S1 is the change tag associated with the operation of creating the second version 40b. The LN 20b has been updated to include the lines added in the operation of creating the second version 40b. Note that no lines are ever deleted from the LN 20b.

Referring now to the VH files, the first VH file 22a includes four records 30, each including one of the ULIs of the lines in the first version and specifying that the lines become active in version 0. The second VH file 22b. includes all the records from the first VH file 22a and additional records indicating the changes entered into the second version 40b. More specifically. the records are sequentially numbered to clarify the following description. The second record has been added to indicate that line E.1 has been replaced in the second version. Note that the records with the same ULI are adjacent. The third record identifies the line that has replaced the deleted line. This record immediately follows the last record indicating a replaced line.

Again, as with the LN 20, the second VH file 22b is formed by updating the first VH file 22a and no records have been deleted.

Referring again to FIG. 5, the third version 40c is updated by replacing the first two lines of the second version 40b with new lines. The new LN 20c is formed by adding the lines identified by ULIs S2.1 and S2.2 to the second LN 20b. The field S2 in the ULIs is the change tag associated with the operation of creating the third version.

Turning to the third VH file 22c, those records having VNs equal to 0 or 1 are the records from the second VH file 22b. The fourth record indicates that the line identified by Sl.1 is replaced in the third version; the sixth record indicates that the line identified by E.2 is replaced in the third version; and, the seventh and eighth records indicate that the lines identified by S2.1 and S2.2 are added in the third version. The records indicating lines added in the third version immediately follow the last record indicating that a line has been replaced.

At this point, all the information required to create the text file of any version in the path is included in the LN 20c and the VH 22c. Further, the text file of a selected version is created directly without the requirement of creating intermediate versions.

PROCEDURE FOR CREATING A TEXT FILE

FIG. 6 is a flow chart illustrating the procedure for creating a selected version. VN=M. in a path.

Referring to FIG. 6, the first VH record is read 50 and saved 52. An attempt is then made to read 54 the next VH record. If there are no more records then the end of the file has been reached 56 and the process branches to a closing label (B) 57. Otherwise, the ULIs of the saved and read records are then compared 58 to determine whether they are different. If they are not different then, because of the ordering of the records in the VH file, the second record indicates the version number where the identified line is replaced or deleted. Accordingly, the version number of the read record is compared 60 to M to determine whether the identified line was deleted in a version following the version being created. If this version number is not greater than M, then the line was deleted in a preceding version or the desired version and is not included in the version M. Accordingly, the process branches back to point A.

If this version number is greater than M, then the line is deleted in a subsequent version in the path. Thus, the value of the status flag is examined 62 and the version number of the saved record is compared 64 to M. If the version number in the saved record is less than or equal to M and the value of the status flag is (A) then the identified line becomes active in a preceding or the desired version, is retrieved from the line file, and is included in the text file of the version M. If the version number is greater than M then this ULI does not affect version M and the process branches back to point A.

Returning to step 58, if the ULIs are different then the value of the status flag in the saved record is examined 62 and the VN is compared 64 to M. The line identified by the ULI in the saved record is included 66 in the text file if the value of the status flag in the saved record is (A) and the VN is less than or equal to M. If the version number in the saved record is greater than M, then the identified line was introduced in a version following version M and is not present in version M. In this case, the process branches to point A.

Each adjacent pair of records in the VH is processed, with the first record in the pair being the saved record and the second record in the pair being the next read record, as described above until the end of the VH file is reached.

The closing subroutine 57 will now be described. The last record is examined to determine if status flag is (A) 57b, and if the VN is less than or equal to M 57c. If both these conditions are met than the line identified by the ULI in the last record is included 57d in version M. Otherwise, the line is not included and the process returns 57e to a calling program.

A specific example of the operation of this process to create version 1 of FIG. 5 utilizing the VH and line file 20(c) and 22(c) of FIG. 4 will now be described for the case M=1. Referring now to FIGS. 4–6, the ULIs of the first pair of records, the first and second, are not different 58 and the VN of the second record is not greater than 1 60. Thus, the line identified by the ULI is replaced in version 1 and is not included.

The ULIs of the next pair of records, the second and third, are different 58, the VN in the second record is equal to M 64, but the status flag is not (A) 62. Thus, the line identified by the ULI is not included.

The ULIs in the next pair of records, the third and fourth, are not different 58, the VN in the fourth record is greater than M 60, the value of the status flag in the third record is (A) 62, and the VN of the first record is equal to M 64. Accordingly, the line identified by the first record, stu, is included 66 in the text file of version 1. The process for creating the remainder of the text file for version 1 follows directly from the above description.

It is now apparent that the procedure depicted in FIG. 4 is able to utilize the VH and LN files for a given path and directly create the text file of a selected version in the path.

DESCRIPTION OF THE MERGE PROCEDURE

An important feature of the present system is the ability to merge changes introduced along two independent paths into a resulting version. This procedure is illustrated in FIG. 7. The letters in parentheses are the change tags associated with the operation of creating each version. These change tags appear in the ULIs of all new lines added in the associated versions.

Versions (T.0), (T.1). and (T.2) form the first three versions in a TO path 70. The first version (F.0) in a FROM path 72 and version (T.3) in the TO path both diverge from (T.2). Each path has its own VH file and shares a single common LN file.

The operation of merging version (F.2), the FROM version, into version (T.4), the TO version, creates a resulting version (T.5) reflecting the changes made along both paths subsequent to their divergence at version (T.2). Accordingly, a resulting VH file (RVH) must be created so text files of all versions in the TO path, including the resulting version (T.5). may be created from the RVH file utilizing the procedure described with reference to FIG. 6.

The change lists for (F.2) and (T.4) are required to perform the merge operation. A change list is a list of the change tags which have been applied to create the version owning the list. Table 1 depicts the change lists for versions (F.2) and (T.4).

TABLE 1

| VERSION | CHANGE LIST |
| --- | --- |
| (F.2) | A,B,C,S,T,U |
| (T.4) | A,B,C,D,E |

The procedure for creating the RVH file includes the steps of generating a common list (tags in both change lists), a TO list (change list for the TO version), and a FROM list (change list for the FROM version), Table 2 depicts the change tags in these lists.

TABLE 2

| COMMON LIST | A,B,C |
| --- | --- |
| FROM LIST | A,B,C,S,T,U |
| TO LIST | A,B,C,D,E |

The status of a given line in the resulting version depends on the change tag included in the ULI identifying the given line. If the change tag is in the common list, then the status of the given line in the resulting version depends on the status of the given line in both (F.2) and (T.4) and is determined by a set of predetermined rules.

The predetermined set of rules utilized to determine the status of the given line identified by a ULI having a change tag in the common list is represented in FIG. 8 by a matrix 83. Referring to FIG. 8, the matrix 83 has its rows labelled by the status of the given line in the FROM path and its columns labelled by the status of the given line in the TO path. The elements in the matrix 83 are set forth in boxes 84 sequentially numbered from 0 to 35. The meaning of the symbols utilized to label the rows and columns of the matrix are defined in Table 3. The symbols utilized to define the matrix elements 86 are defined in Table 4. An (*) in a box 84 indicates that a new record will be written to the RVH file. The method for utilizing the matrix will be described more fully below.

TABLE 3

(Active, <=): line was active when files diverged/previously merged and has not been altered since then;
(Active, >): a backout of a change, resulted in a change to this ULI since the files diverged/previously merged;
(Inactive delete, <=): line was deleted when files diverged/previously merged and has not been altered since then;
(Inactive delete, >): line was deleted since the files diverged/previously merged;
(Inactive replace, <=): line was replaced when files diverged/previously merged and has not been altered since then;
(Inactive replace, >): line was replaced since the files diverged/previously merged.

TABLE 4

A: the result of the merge is that the ULI is left active; no new VH record is written;
I: the result of the merge is that the ULI is left inactive: no new VH record is written;
R: the result of the merge is that the ULI is left replaced: no new VH record is written;
A*: create a new VH record indicating that the ULI is now active:
I*: create a new VH record indicating that the ULI is now deleted;
R*: create a new VH record indicating that the ULI is now replaced.

The symbols <= and > indicate the result of a comparison between the change which created the VH record being considered and the common list of changes. This determines whether the VH record's information was already known when the paths diverged or were last merged, or whether the information is new since the last such point of divergence.

The mechanism currently used for deciding when a change occurred in relation to the last divergence point involves comparing the version number in a VH record with a "common version" on the path currently being considered.

The "common version" is determined by comparing the common list of tags with the list of tags present in each significant version of the TO or FROM path, starting at the earliest version. The first such version which includes all common tags, or includes tags not found in the common list, is the desired common version.

Thus for a simple case, where version 0 of a new path is being merged back into the path from which it diverged, the common version would be −1.

The procedure for merging two modules will now be described with reference to FIGS. 9 through 18. FIG. 9 illustrates a merge operation from version (F.0) (FROM version) in a FROM path to version (M.1) (TO version) in a MAIN path. The text file and ULIs for each version are depicted. Additionally, the VH file generated when each version was created is shown associated with the various versions. The change lists for (F.0) and (M.1) are depicted in Table 5 and the common. TO. and FROM lists are depicted in Table 6.

TABLE 5

| VERSION | CHANGE LIST |
| --- | --- |
| (F.0) | E,F0 |
| (M.1) | E,M1 |

TABLE 6

| COMMON LIST | E |
| --- | --- |
| FROM LIST | E,F0 |
| TO LIST | E,M1 |

The VH file associated with (F.0) is the FVH, the VH file associated with (M.1) is the TVH, and the VH file associated with (M.2) is the RVH.

FIG. 10 is a flow chart listing the steps in the Merge-Main routine which coordinates the overall merge operation. This program invokes numerous subroutines which perform the detailed operations necessary to merge two paths of a module.

Referring now to FIG. 10, the first step 100 is to build a list of the module names to include and exclude from the merge. In the present example, module E is included in the merge. Next, the merge list is tested 102 to determine whether there are more modules to merge. If no, then the program branches to a closing label A 103. If yes, the LN file for module E. and VH files for the FROM and TO variants are opened 104 and a new VH file (RVH) is created 106 for the results of the merge.

Next, the procedure for merging the variant paths is called 108. These procedures are described below. If the merge is successful 110 then the variant record is updated 112, if not the program jumps to step 102. Next, a new record describing the version is created 114 and and the LN file and VH files are closed 116. The program then returns to step 102. If there are no more modules to be merged, then the closing portion 103 is executed.

Referring to the closing, a change record is built 103a to reflect the merge, the new VH file is renamed and the old one purged 103b, and the results of the merges are reported 103c.

FIG. 11 is a flow chart listing the steps of the MERGE-VARIANT-PATHS procedure. This procedure controls the mechanics of merging two paths of one module. Referring to FIG. 11, the TO list, FROM list, and common list for (F.0) and (M.1) are generated 310. The contents of these lists are set forth above in Tables 5 and 6. Next, the lists are examined 320 to determine whether the FROM list is a subset of the TO list. If yes, than there is no need to proceed further because the status of all lines in the FROM version have already been used in determining the status of the lines in the TO version.

If not, then the first record from the TVH and FVH files are read 340. Next, it is determined that the end of the file has not been reached 350. The procedure then tests the change tags in the ULIs of the read records to determine whether the tags in the ULIs in the first TVH and FVH records are in the common list 360, whether only the tag in the first TVH record is in the common list 362, whether only the tag from the first FVH record is in the common list 364, or whether neither the tag in the first FVH record nor the the tag in the first TVH record is in the common list. Depending on which condition is true, the appropriate subroutine 368. 370, 372, or 374 is called.

The operation of the MERGE-VARIANT-PATHS subroutine 300 will be described with reference to the example illustrated in FIG. 9. The first record in the TVH file (E.0 0 A) and in the FVH file (E.0 -1 A) are read 340. The change tag (E) in both records are in the common list 360 and the subroutine PROCESS-ULI-IN-BOTH-PATHS is called 368.

FIG. 13 is a flow chart of this subroutine. Referring to FIG. 13, the ULIs in both records match 502. The read (first) TVH record is written to the new VH file 504 and the value of the status flag (A) of the record is saved 506. The next (second) TVH record (E.1 0 A) is read 508 and the saved ULI and ULI of the next read record are compared 510. In this case, the ULIs are different.

The read (first) FVH record is then examined to determine whether the version number in the record is less than or equal to the version number of (F.0) 512 and if so, the status flag of the record is saved 513. In this case, the version number (−1) in the record is less than the version number (0) of the FROM version and the status flag (A) is saved. The next (second) FVH record (E.1 −1 A) is read 514 and the ULIs of the saved and next read FROM records are compared 516.

In this case, the ULIs are different and the saved status flags are utilized 518 to execute the case statement which implements the predetermined set of rules. As described above, this set of rules is shown as a matrix. Referring to FIG. 8, and Tables 5 and 6, for both paths the line was active before divergence and no changes have been made since then (A, < =). Accordingly, case statement 0 is executed and the line is active in the resulting version. The result of the subroutine is that the first record in the RVH file is the same as the first record in TVH file and no new record is created. The subroutine then returns 520 to the calling subroutine.

The steps 350, 360, and 368 of the MERGE- VARIANT-PATHS procedure are then repeated for the second records in TVH and FVH files and the subroutine PROCESS-ULIS-IN-BOTH-PATHS 368 is called. From the structure of the TVH and FVH files it is apparent that the first five records in those files are processed as described above and that the first five records in the RVH file are the same as the first five records in the TVH file.

Referring to FIG. 13, after the fifth TVH record is written 504 and the sixth TVH record is read 508, the ULIs of the two records are compared 510. In this case the ULIs are not different and the subroutine branches back to step 504. The sixth TVH record (E.4 1 R) is written to the RVH file, the status flag (R) is saved 506, and the seventh TVH record (FO.0 0 A) is read 508. The ULIs are then compared 510 and found to be different.

The sixth FVH record (E.4 0 R) is read 514 and its ULI is compared to the ULI of the fifth record 516. The ULIs are the same so the subroutine branches back to step 512. The status flag (R) of the sixth record is saved 513 and the seventh FVH (FO.0 0 A) record is read 516. The ULIs of the sixth and seventh records are compared 516 and found to be different.

The saved status flags are then utilized 518 to execute on of the case statements of the predetermined set of rules. As described above, this set of rules is implemented as a case statement based on the matrix shown in FIG. 8. Referring to FIG. 8, and Tables 5 and 6. for both paths the line was replaced since divergence (R,>). Accordingly, case statement 35 is executed, the line is replaced in the resulting version, a new record is generated and written to the RVH file, and a conflict message is generated. The result of the executing the subroutine is that the record (E.4 2 R) is generated and written as the seventh RVH record. The subroutine then returns 520 to the calling subroutine.

The change tags of the ULIs in the seventh TVH and FVH records are compared to the change tags in the common list and it is determined that neither tag is in the common list 360,362,364. Accordingly, the subroutine NEW-LINES-IN-BOTH-PATHS is called 374.

FIG. 17 is a flow chart for this subroutine. In FIG. 17, first the TVH file records re processed 900 and then the FVH file records are processed 910. If it is determined that lines from both paths are active in the resulting version 920, then a warning message is printed and the active lines are displayed 922. This feature calls attention to the possible conflict between the lines added along the independent paths and provides for a quick review of the lines added. The method of keeping track of these active lines is described below.

The subroutine PROCESS-ULI-IN-TO-PATH is called in step 900. FIG. 14 is a flow chart for this subroutine. In FIG. 14, the seventh TVH record is written to the new VH 600, the eighth TVH record is read 602, and the ULIs of the two records are compared 606. In this case the ULIs are different, the status flag in the seventh record is examined 608 to determine whether the value of the status flag is (A). and active-TO-ULI-count is incremented 608. This count keeps track of new ULIs added in the TO path since the point of divergence and which are active. The change tag of the ULI in the eighth record is then compared to the change tags in the common list 610 to determine whether the ULI is in the common list. In this case it is not and the subroutine branches back to step 600.

The processing of the eighth through eleventh TVH records is the same as described above with the result that these records become the ninth through twelfth records of the RVH. The twelfth TVH record (E.5 0 A) is read 602, the count is incremented 609, it is determined that the new ULI read is in the common list 610, and the subroutine returns to step 900 of the calling subroutine. The subroutine PROCESS-ULI-IN-FROM-PATH is then called 910.

FIG. 16 is a flow chart of that subroutine. In FIG. 16, the status flag (A) of the seventh FVH record is saved 800 because the version number in the record is equal to version number of the FROM version, the eighth FVH record is read 810, and ULIs of the records are compared 812. In this case, the ULIs are different and a new VH record is built 814 that reflects the last saved state. This new VH record, (FO.0 2 A), indicates that the line identified by the ULI (FO.0) becomes active in version 2, the resulting version, in the TO path as a result of the merge operation and which are active. The record built is written to the RVH file 816 and the status flag of the record is examined 818 to determine whether its value is (A). If so, active-FROM-ULI-count is incremented 820. This count keeps track of new lines added from the FROM path during the merge operation and which are active. The change tag of the ULI in the eighth record is then compared 822 to the change tags in the common list to determine whether the ULI is in the common list. In this case it is not and the subroutine branches back to step 800.

The processing of the eighth through tenth FVH records is the same as described above with the result that the fourteenth through sixteenth records are built reflecting that these lines become active as a result of the merge.

It is determined 822 that the change tag in the ULI of the eleventh FVH record is in the common list and the subroutine returns 824 to step 910 of the calling subroutine. The counts generated in the two called subroutines indicate that new lines in both paths become active in the resulting version and the warning message is printed and the new lines are displayed 922. The subroutine then returns to step 350 of the calling procedure.

It is then determined that the change tags of the eleventh FVH record and twelfth TVH record are in the common list 360, and the procedure PROCESS-ULI-IN-BOTH-PATHS described above are utilized to write the twelfth through fifteenth TVH records to the new VH. It is then determined that the end of a VH file is reached and part (B). FIG. 12, is executed to complete the merge.

FIG. 18 depicts the subroutine SKIP-THIS-MERGE-ULI. This subroutine is not used in the above example but may be called by the subroutine PROCESS-FROM-PATH-VH-RECS when the FROM version is not the last version created in the FROM path. This subroutine prevents changes made in the FROM path subsequent to the creation of the FROM version from being included in the resulting version.

The generation of change lists and determination of the point of divergence for the example of FIG. 9 was possible from inspection. However for more complicated cases where several independent paths exist and merges between paths have been made previously, the generation of the list is more difficult. FIG. 20 is a schematic diagram depicting such a complex case. The use of the change list to generate the common list is important to the above-described merge procedure and facilitates the generation of conflict messages and other advantageous features.

A generalized procedure for building the change list for a version will now be described. This procedure is an application of graph theory. A significant version is defined as either the first version in a variant (i.e. version 0). or was the version from which a new variant was created, or was the version created as the result of a merge operation, or was the version from which a merge was done. All significant versions are candidates for being the common versions in a merge operation.

The versions of the module are considered as part of a directed, acyclic graph. All versions of the module are descendents of the original version (version 0) in the original path. Each version can be created in only one of four ways, i.e.. (a) by adding a module to the database; (b) by checking in a checked out version; (c) by creating a new path: or, (d) as the result of a merge operation.

The algorithm for creating the change tags starts by representing the graph of versions as a graph of significant versions. Each such version is assigned its own change list, which is initially empty. The first (earliest) significant node has its own change tag placed in its change list, Next, the call VISIT(earliest node) is made, where VISIT is the following recursive procedure:

```
procedure VISIT(j)
{j is a node in the graph}
begin
        for each node k, where the link (j —>k)
        exists, do
        begin
                if (k is the result of a merge)
                and (change tag for node j is not in
                list (k))then
                        list (k) <— COMBINE(j,k)
                else
                        list(k) <— COMBINE(j,k)
                        call VISIT(k)
        end
end.
```

Where the procedure COMBINE is:

```
produce COMBINE(x,y)
{x and y are nodes, and this procedure returns a
change list}
begin
        make resulting list empty
        add every change tag in list(x) to resulting
        list
        add every change tag in list(y) to resulting
        list
        add change tag for node x to resulting list
        return resulting list
end.
```

The invention has now been described in terms of preferred embodiments. Modifications and substitutions will now be apparent to persons or ordinary skill in the art. In particular, the rules for processing ULIs in both the TO and FROM paths may be varied according to specific systems requirements. Therefore, it is not intended that the invention be limited except as provided by the appended claims.

What is claimed is:

1. A method for directly creating a text file of a desired version of a stored module, with the version comprising a plurality of lines of text and included in a development path including several versions, said method comprising the steps of:

storing all lines active in the several versions in the path in an indexed line file; an d retrieving only those lines active in the desired version from the line file for inclusion in the text file.

2. A method for storing a desired version of a module, where the desired version comprises a plurality of lines of text and is included in a given path which is one of many possible paths, with each path including an ordered set of versions of a common module, with each version identified by a version number, with each version in a path evolving from an immediately preceding version, and where a status history of activations and deletions of each line in a path is stored in a variant history file for the path, said method comprising the steps of:

storing all lines active in all versions in all paths in an indexed line file;

identifying each line in said indexed line file by a unique line identifier (ULI); and storing a set of records, in the variant history file for the given path, for each ULI identifying a line active in any version in the given path, with each record in a set indicating a version number of a version in a given path where the line identified by the ULI becomes active, or a version number of a version in the given path where the line identified by the ULI is deleted.

3. A method for creating a text file of a desired version of a module, where the desired version is included in a given one of many possible paths, with each path including an ordered set of versions, each identified by a version number, of a common module, with each version in a path evolving from an immediately preceding version, and where a status history of activations and deletions of each line active in any version in a path is stored in a variant history file for the path, and where text of lines active in all versions in all paths is stored in an indexed line file with each line in the indexed line file identified by a unique line identifier (ULI), said method comprising the steps of:

identifying the given path in which the desired version is included and the version number of the desired version in said given path;

searching the variant history file of the given path to determine which lines in the line file are active in the desired version; and retrieving, from said line file, the text of lines determined to be active in the desired version.

4. The method of claim 3 wherein:

the variant history file of the given path includes an ordered set of records identifying a line active in any version in the given path, with each record in a set comprising an included ULI and indicating a version number in a given path where the line identified by the included ULI becomes active, or a version number in the given path where the line identified by the included ULI is deleted; with the records in said variant history file ordered so that the record indicating a version number of a first given version, in which a given line becomes active, immediately precedes a record indicating the version number of a second given version in which said given line is deleted, and where the records of lines made active in the second given version immediately follow the last record indicating a line is deleted in the second given version, and wherein said step of searching comprises:

reading an adjacent pair of records including a preceding and a following record in said variant history file;

determining whether the included ULIs in said adjacent pair of records are the same;

if the included ULIs are the same, including the identified line in the desired version only if the version number indicated by said following record is greater than the version number of said desired version, if the version number indicated by the preceding record in the pair is less than or equal to the version number of the desired version, and if the identified line indicated by the preceding record in the pair is active; and if the included ULIs are different, including the identified line in the desired version only if the version number indicated by said preceding record in the pair is less than or equal to the version number of the desired version and if the identified line indicated by the preceding record in the pair is active.

5. The method of claim 3 wherein:

the variant history file of the given path includes a set of records identifying a line active in any version in the given path, with each record in a set comprising an included ULI and indicating one of the version numbers of the versions in a given path where the line identified by the included ULI becomes active, or one of the version numbers of the versions in the given path where the line identified by the included ULI is deleted;

and wherein said step of searching comprises the steps of:

ordering the records in said variant history file so that the record indicating a version number of a first given version, in which a given line becomes active, immediately precedes the record indicating the version number of a second given version in which said given line is deleted, and where the records of lines made active in the second given version immediately follow the last record indicating a line is deleted in the second given version;

reading an adjacent pair of records including a preceding and a following record in said variant history file;

determining whether the included ULIs in said adjacent pair of records are the same;

if the included ULIs are the same, including the identified line in the desired version if the version number indicated by said following record is greater than the version number of said desired version, if the version number indicated by the preceding record in the pair is less than or equal to the version number of the desired version, and if the identified line indicated by the preceding record in the pair is active; and if the included ULIs are different, including the identified line in the desired version if the version number indicated by said preceding record in the pair is less than or equal to the version number of the desired version and if the identified line indicated by the preceding record in the pair is active.

6. In a version control system which stores several versions of a module, where each version is included in one of many possible paths, with each path including an ordered set of versions, each identified by a version number, of a common module, with each version in a path evolving from the immediately preceding version, with a unique change tag associated with the operation of creating a given version, where the text of all lines active in all versions along all paths of the module are stored in an indexed line file and identified by a unique line identifier (ULI). with each ULI including a tag field identifying a version and an index field, and where the status history of the activation and deletions of each line in a path are stored in a variant history file for the path, with each record in the variant history file including a ULI. a version number identifying a version in the path, and a status flag having a value indicating that the line identified by the ULI becomes active, is replaced, or is deleted in the identified version, a method for building a resulting variant history file for a TO path to reflect the merge of a selected version in a FROM path into a TO version, which is the last version in the TO path, to form a resulting version in the TO path, said method comprising the steps of:

providing a TO path variant history file and a FROM path variant history file;

building a TO change list for said TO version;

building a FROM change list for the selected version in the FROM path;

building a common list of the change tags included in both said FROM change list and said TO change list;

writing, in the resulting variant history file, a first set of TO variant history records, with the first set consisting of only those TO variant history records that include ULIs with change tags included in said TO change list but not included in said common list;

identifying a second set of FROM variant history records, with said second set consisting of only those FROM variant history records that include ULIs with change tags in said FROM change list but not included in any record in said TO change list or said common list, and, for each of those ULIs, only the FROM variant history record having the greatest version number that is less than or equal to the version number of the selected version in the FROM path:

modifying said second set of FROM variant history records so that the version number in each record is equal to the version number of the resulting version in the TO path:

writing, to the resulting variant history file, said modified second set of FROM variant history records;

writing, to the resulting variant history file, a third set of TO variant history records, with said third set consisting of only those TO records that include ULIs in said common list and that are included in a record in the TO variant history file and the FROM variant history file: and generating a fourth set of resulting variant history records, with each record in said fourth set associated with a selected one of the records in said third set and including the same ULI as the associated record, with the selection of a given selected record from said third set and the assignment of the value of the status flag in the fourth set record associated with the given selected record determined by the values of the version numbers and status flags of records in the FROM and TO variant history files that have the same ULI as the given selected third set record and by a predetermined set of rules applied to those values.

7. In a version control system which stores several versions of a module, where each version is included in one of many possible paths, with each path including an ordered set of versions, each identified by a version number, of a common module, with each version in a path evolving from the immediately preceding version, with a unique change tag associated with the operation of creating each version, where the text of all lines active in all versions along all paths of the module are stored in an indexed line file and identified by a unique line identifier (ULI). with each ULI including a change tag and an index field, a method for merging a selected version in a FROM path into a TO version, which is the last version in the TO path, to form the text file of a resulting version in the TO path, said method comprising the steps of:

building a common list of change tags included in ULIs identifying lines that have been active in both the TO and FROM paths;

including, in the text file of the resulting version, lines identified by ULIs having change tags in said common list according to the status, in the TO and FROM versions, of the lines identified and according to a set of predetermined rules.

8. A computer operating under control of a stored program for allowing a user to store a source file module, to create and store new versions of the module, to create and name independent paths of development of the module, with each path being an ordered set of versions, comprising:

an I/O unit;

memory means for storing a source file module, new versions of the source file module, an indexed line file, and a variant history file;

a user interface, connected to the memory means by said I/O unit, for accessing existing versions from said memory and storing modified versions in said memory;

CPU means, connected to the memory means by said I/O unit, for executing stored program instructions to build an indexed line file, stored in the memory, including the text of all lines active in all versions in all paths, with each line in said indexed line file identified by a unique line identifier (ULI), to build a variant history file, stored in the memory, including a set of records associated with each ULI identifying a line included in any version along a given path, where each record in a given set of records associated with a given ULI indicates a version in the given path where the line identified by the ULI became active or a version in the given path where the ULI was deleted; and for utilizing said variant history file and indexed line file to directly generate the text file of a desired version in said given path without creating any intermediate versions.

9. A computer operating under control of a stored program for allowing a user to store a source file module, to create and store new versions of the module, to create and name independent paths of development of the module, with each path being an ordered set of versions, and with the versions in the path identified by version numbers, and for building, in the memory, an indexed line file, including the text of all lines active in all versions along all paths of the module, and a variant history file for given path, wherein the improvement comprises:

- a memory for storing an indexed line file, a variant history file, and program data;
- a CPU, connected to said memory, for executing said program data to create an indexed line file having a unique line identifier associated with each line in the line file and a variant history file including an ordered set of records, with each record including a unique line identifier, associated with a line active in one of the versions in the given path, and indicating one of the version numbers in the given path where the line identified by the unique line identifier became active or one of the version numbers in the given path where the line identified by the unique line identifier was deleted.

10. The computer of claim 9 also for generating a change tag associated with the operation of creating a new version, wherein said program data when executed by said CPU causes each unique line identifier to include a change tag associated with the operation of creating the version where the line identified by the unique line identifier first became active; and causes said variant history file to have its records ordered so that record indicating a version number of a first given version, in which a given line becomes active, immediately precedes record indicating the version number of a second given version in which said given line is deleted, and where records of lines made active in the second given version immediately follow a last record indicating a line is deleted in the second given version.

* * * * *